United States Patent [19]

Estes

[11] 4,219,859
[45] Aug. 26, 1980

[54] MULTIPLE RANGE INVERSE TIME OVERCURRENT RELAY

[75] Inventor: Michael J. Estes, Scotts Valley, Calif.

[73] Assignee: RTE Corporation, Waukesha, Wis.

[21] Appl. No.: 2,532

[22] Filed: Jan. 11, 1979

[51] Int. Cl.² .................................................. H02H 3/08
[52] U.S. Cl. ........................................ 361/93; 361/103
[58] Field of Search .................. 361/93, 103; 307/117, 307/311

[56] References Cited

U.S. PATENT DOCUMENTS

| | | | |
|---|---|---|---|
| 4,054,934 | 10/1977 | Riebs | 361/93 |
| 4,156,262 | 5/1979 | Eller et al. | 361/93 X |

FOREIGN PATENT DOCUMENTS 2219043  10/1973  Fed. Rep. of Germany ............. 361/93

Primary Examiner—Harry E. Moose, Jr.
Attorney, Agent, or Firm—Ronald E. Barry

[57] ABSTRACT

A relay for tripping a circuit breaker in a high voltage power line, the relay including a current transformer having first and second turns ratios, a heat radiation circuit including a plurality of lamps connected to the current transformer and a sensing circuit including a phototransistor which responds to heat radiation from one of said lamps, the turns ratios and lamps being selectively connectable to provide different minimum trip current levels of the relay.

10 Claims, 2 Drawing Figures

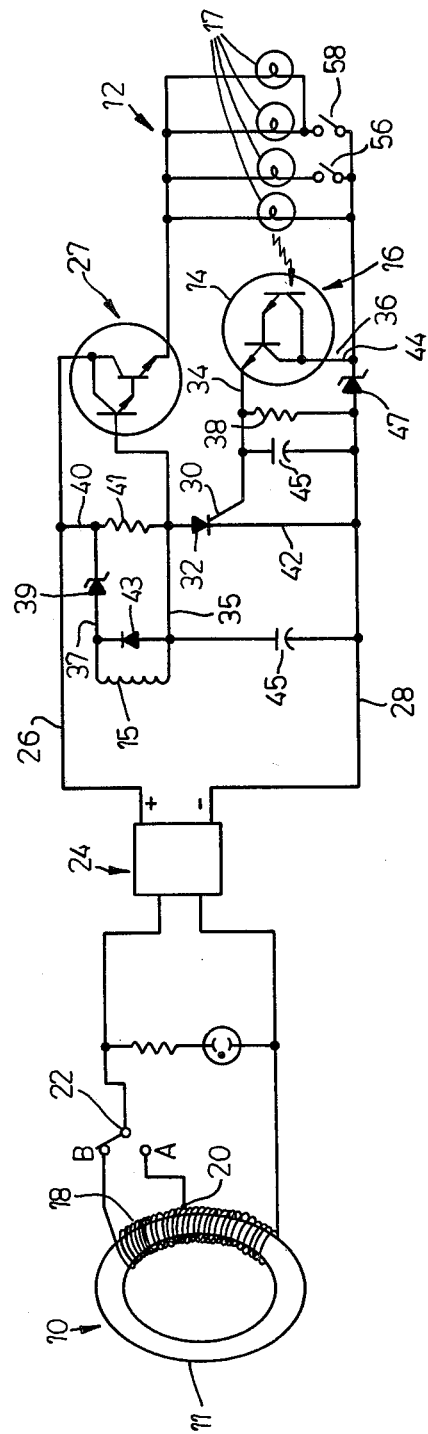

MULTIPLE RANGE INVERSE TIME OVERCURRENT RELAY

BACKGROUND

An inverse time overcurrent relay was disclosed in U.S. Pat. No. 4,054,934 issued on Oct. 18, 1977 and entitled Solid State Inverse Overcurrent Relay. In this disclosure the current transformer required for the higher minimum trip ratings for conventional lamps had to have an inordinately large number of turns. This made the transformer bulky, expensive and difficult to apply with a higher minimum trip level rating. One alternative to solving this problem was to obtain a specially made lamp which had an extremely heavy filament for its envelope size. This also proved to be economically unfeasible. In order to change the minimum trip level, either the current transformer ratio or the lamp had to be changed.

SUMMARY

The overcurrent interrupter control relay according to the present invention combines a selective turns ratio current transformer with a combination of conventional light bulbs to provide a variety of minimum trip current levels for a high voltage line. The current transformer utilizes a basic turns ratio with an additional number of turns to form a second ratio in the order of the square root of two larger number of turns than in the first turns ratio. Conventional lamps are used in the sensing circuit and are arranged to be switched into the circuit in such fashion that six separate curves can be produced. Each curve being similarly shaped but with different minimum trip levels.

DRAWINGS

FIG. 1 is a schematic circuit for the multiple range interrupter control according to the invention.

FIG. 2 is a chart of a proposed turns ratio lamp combination to provide minimum trip levels.

DESCRIPTION

Referring to FIG. 1 of the drawings, the multiple range interrupter control relay generally includes a current transformer means 10 which is used to sense line current in a high voltage power line. The AC current from the current transformer means 10 is rectified by means of a current rectifier 24 to provide a DC output signal to a heat radiation circuit means 12 and a sensing circuit means 16. The heat radiation circuit means 12 includes a number of lamps 17, one of which is used to produce a heat or radiation signal. The sensing circuit means 16 includes a phototransistor 14 which senses the heat or radiation produced by the lamp 17. The phototransistor 14 on sensing a predetermined heat or radiation signal from the lamp 17 is activated to energize a trip coil 15 that is used to open a circuit breaker (not shown) in the high voltage power line.

More particularly, the current transformer means 10 includes a current transformer 11 which is provided with a predetermined number of turns 18 with a tap 20 located in a position to provide a first turns ratio for the first portion of the turns and a second turns ratio for the full number of turns 18 in the transformer. The number of turns in the second turns ratio perferrably equals the first turns ratio multiplied by the square root of two. Means are provided for selectively connecting the first or second turns ratio to the current rectifier 24, such means including a switch 22 having contacts A and B. Two current transformer ratios are thereby provided by the current transformer means 10. The DC output signal from the current rectifier 24 is produced across lines 26 and 28.

The lamps 17 provided in the heat radiation circuit means 12 can be any conventional type lamps such as type 912 lamps having a tungsten filament or any filament material that will withstand high temperature and will provide a time-current characteristic in which the time to reach a predetermined temperature is inversely proportional to the second power of current. The lamps are connected in parallel across the lines 26 and 28. Current flow to the lamps 17 is provided by means of a transistor 27 connected in line 26. Base circuit current to turn on the transistor 27 is controlled by resistance 41. One of the lamps 17 is located to provide a heat or radiation signal to the phototransistor 14.

Means are provided for selectively adding the lamps into the circuit across lines 26 and 28. Such means is in the form of normally open switches 56 and 58. The number of lamps in the circuit can then be increased to 2, 3, or 4 depending on which of the switches 56 and 58 is closed or whether both switches 56 and 58 are closed. It should be noted, however, that regardless of the number of lamps connected in the circuit only one lamp 17 need be used to provide the heat or radiation signal to the phototransistor 14.

The sensing circuit means 16 generally includes the phototransistor 14 which is connected to the gate circuit 30 of a silicon controlled rectifier, SCR, 32 by a line 34 to provide current to trigger the SCR, 32 when the phototransistor 14 is energized. The SCR 32 is connected across lines 26 and 28 by lines 40 and 42 with a resistance 41 provided in line 40. The trip coil 15 is connected to the line 40 by lines 35 and 37 in parallel with the resistance 41. A diode 43 is also connected across lines 35 and 37 in parallel with the trip coil 15. A Zener diode 39 is provided in line 37 to prevent current flow through trip coil 15 until the SCR 32 fires.

The phototransistor 14 includes a collector circuit 36 connected to the line 44 which is maintained at a suitable operating potential for phototransistor 14 by Zener diode 47. The emitter of the phototransistor 14 is connected by the lead 34 to the gate circuit 30 of the silicon control rectifier 32. A resistance 38 is connected across the lead 34 and the line 28. Capacitors 45 are connected across the resistance 38 and the SCR, 32 to prevent unwanted firing of the SCR, 32 by stray voltages. The time current characteristics of the relay provides trip time to be inversely proportional to the second power of current in the secondary of the current transformer.

The combination of two current transformer ratios and one, two or four lamps will produce six different minimum trip current curves, each curve being similarly shaped to provide minimum trip levels.

As an example a 2240 turn current transformer with the tap at 1600 turns used with four type 912 lamps would provide minimum trip levels as shown in the chart in FIG. 2 of the drawings. As seen in the chart, switch 22 in the A position with switches 56 and 58 open will provide a 400 amp minimum trip. Switch 22 in the B position with switches 56 and 58 open will produce a 560 amp minimum trip. Switch 22 in the A position with switch 56 closed and switch 58 open will provide a 800 amp minimum trip. Switch 22 in the B position with switch 56 closed will provide 1120 amp minimum trip. Switch 22 in the A position with both switches 56 and 58 closed will provide a 1600 amp minimum trip and switch 22 in the B position with switches 56 and 58 closed will produce a 2240 amp minimum trip.

The embodiments of the invention in which an exclusive property or privilege is claimed are defined as follows:

1. A relay for tripping a circuit breaker connected in a power system, said relay comprising
   transformer means connected to respond to current flow in the power system
   circuit means for providing a heat radiation signal connected to the transformer means, said means having a time current characteristic in which the time to reach a predetermined temperature is approximately inversely proportional to the second power of current,
   sensing circuit means operatively coupled to the transformer means and being sensitive to a predetermined heat radiation signal from the heat radiation signal circuit means for tripping the circuit breaker in the power system, and switch means in said heat radiation signal circuit means for selectively changing the minimum trip current level of the relay.

2. The relay according to claim 1 wherein said transformer means includes first and second turns ratios and switch means for selectively connecting one of said turns ratios to said heat radiation circuit means to provide a number of minimum trip current levels in combination with the selectively changed signal circuit means.

3. The relay according to claim 1 wherein said transformer means includes a current transformer having a first turns ratio and a second turns ratio and means for selectively connecting one of said turns ratios to the heat radiation signal circuit means, said signal circuit means including a number of heat radiation lamps.

4. The relay according to claim 3 wherein said second turns ratio exceeds the number of turns in said first turns ratio by the square root of two.

5. The relay according to claim 1 wherein said heat radiation signal means comprises a plurality of identical lamps and switch means for selectively connecting one or more of said lamps to said transformer means.

6. The relay according to claims 2, 3 or 5 wherein said sensing circuit means is responsive to only one of said lamps.

7. The relay according to claims 2, 3 or 5 wherein said sensing circuit means includes a phototransistor.

8. An overcurrent interrupter control relay for tripping a circuit in a high voltage power line at different minimum trip current levels, said relay comprising
   a current transformer positioned to respond to current flow in the power line,
   a heat radiation circuit connected to the transformer, said radiation circuit including a plurality of heat radiation means,
   a sensing circuit connected to said current transformer,
   said sensing circuit including means responsive to the heat radiation of at least one of said heat radiation means,
   and switch means for selectively connecting one or more of said heat radiation means into the radiation circuit.

9. The relay according to claim 8 wherein said heat radiation means has a time-current characteristic which is approximately inversely proportional to the second power of current.

10. The relay according to claim 8 or 9 wherein said current transformer includes a first turns ratio and a second turns ratio having the square root of two number of turns more than the first turns ratio and switch means for selectively connecting one or the other turns ratio to the radiation circuit.

* * * * *